United States Patent Office 3,422,457
Patented Jan. 14, 1969

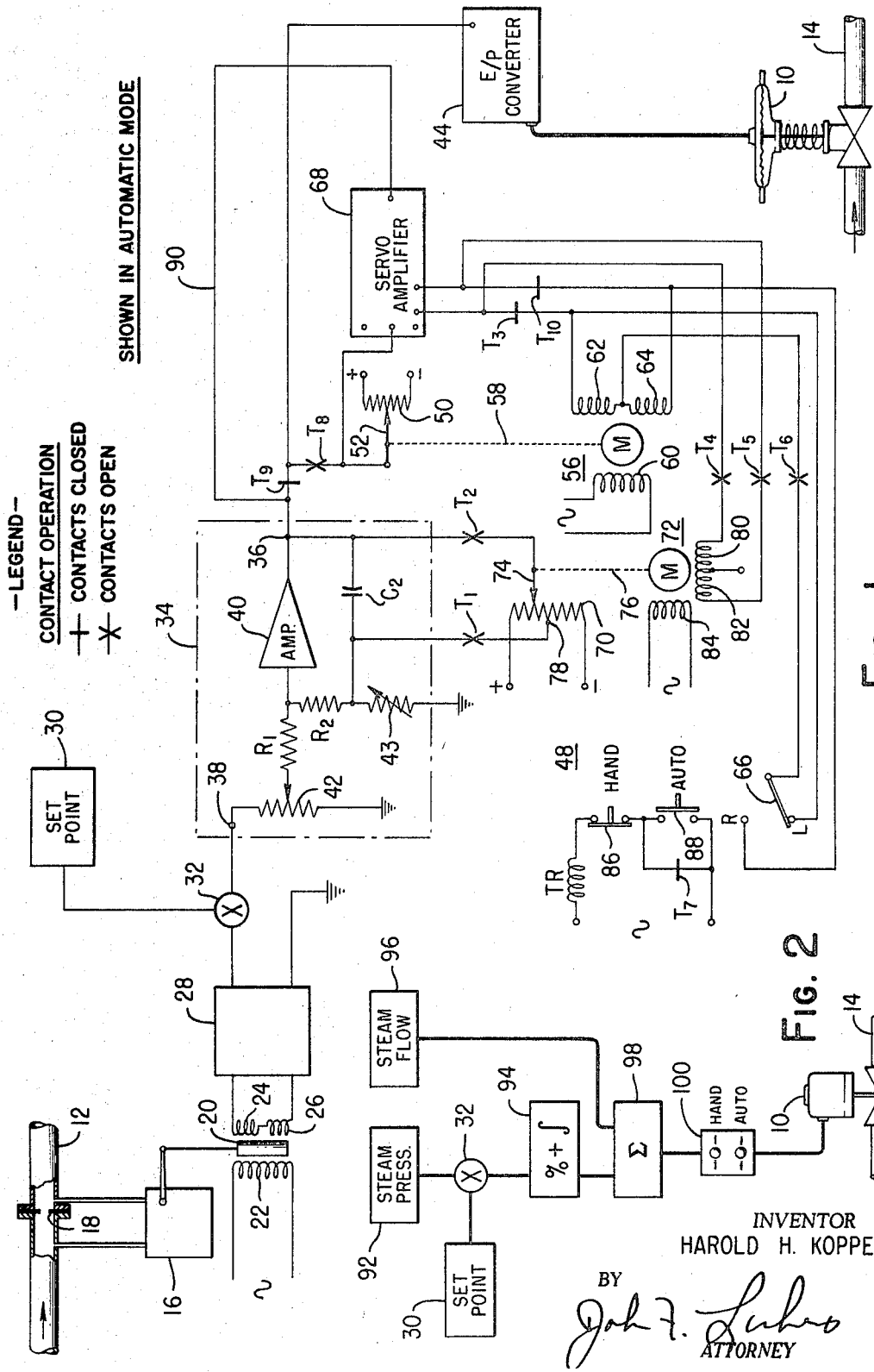

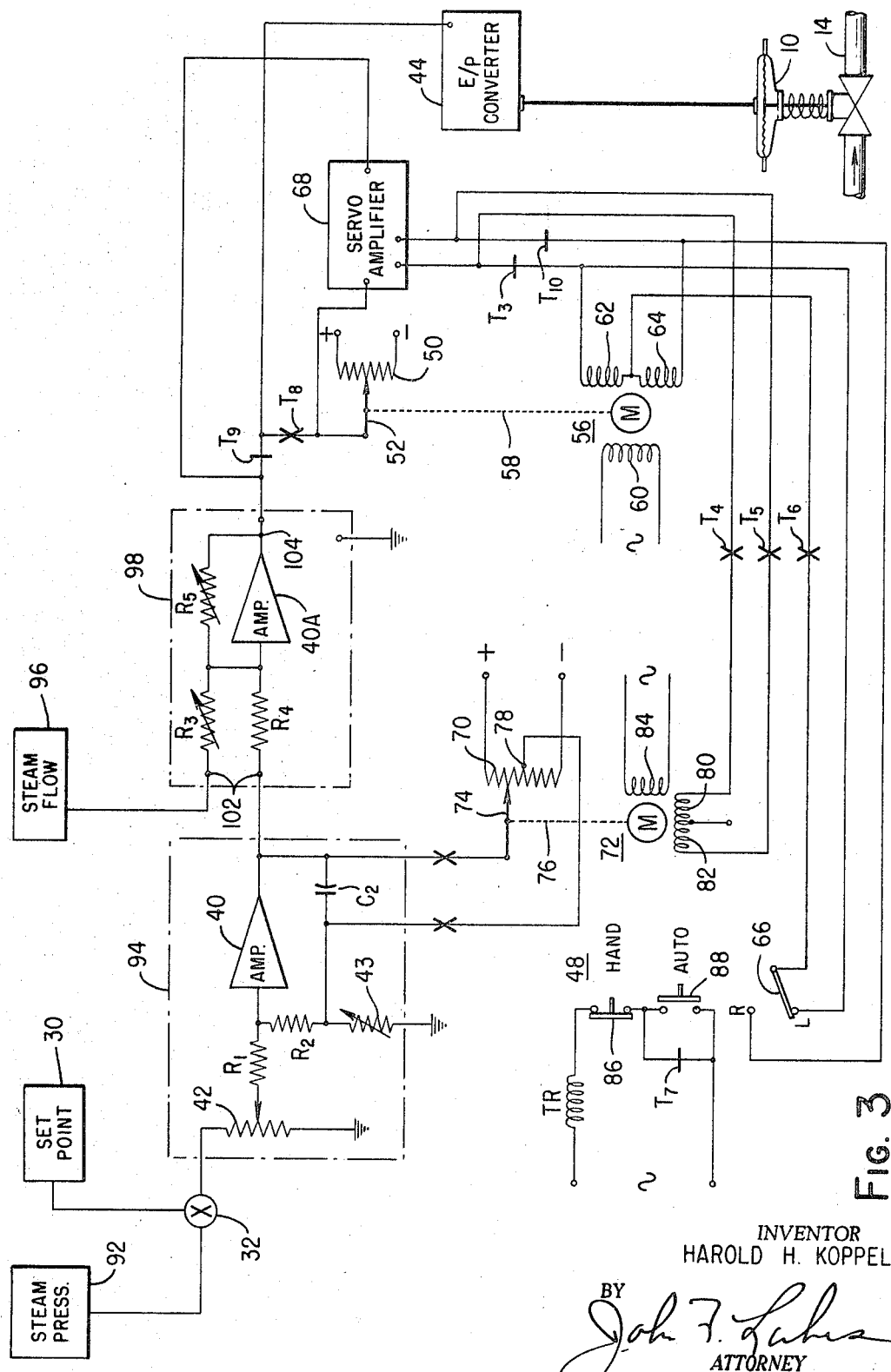

3,422,457
ARRANGEMENT FOR BUMPLESS TRANSFER OF A SERVO CONTROL SYSTEM FROM AUTOMATIC TO MANUAL AND VICE VERSA
Harold H. Koppel, University Heights, Ohio, assignor to Bailey Meter Company, a corporation of Delaware
Filed July 21, 1965, Ser. No. 473,797
U.S. Cl. 318—28        5 Claims
Int. Cl. G05b 11/00

ABSTRACT OF THE DISCLOSURE

A system for providing bumpless transfer between the automatic and manual control mode and vice versa. A reset capacitor is maintained as an integral part of a feedback circuit in the automatic controller during operation in either automatic or manual mode. During manual operation, a charge is developed across said capacitor in proportion to the unbalance between the manual and automatic controller output signals. This charge or voltage continuously maintains the output of the automatic controller equal to the manual controller output during manual operation and thereby insures bumpless transfer from the manual to automatic control mode. During automatic operation, the signal generated by the manual mode means is automatically maintained equal to the signal generated by the automatic mode means thereby insuring bumpless transfer from the automatic control mode to the manual mode.

---

This invention relates to apparatus for controlling a variable from one or the other of two modes of operation. More particularly this invention relates to a system for transferring control of a variable from one mode of operation to another.

One major problem often encountered in transferring a control system from one mode of operation to another, say from manual to automatic, or vice versa, is the fact that an inequality of the outputs of the automatic controller and the manual controller, at the instant of transfer, will produce a shock or bump which may result in instability or damage to the system. Several ingenious schemes have been devised to prevent this "bump," most are unduly complicated and sometimes fall short in their objective, that is, bumpless transfer.

One prior art system uses the feedback capacitor of a reset controller in an effort to eliminate the bump problem. Unfortunately, the output of the automatic controller is not maintained at the manual controller output but is brought up to the manual level at the instant of transfer by reconnecting the feedback capacitor in the feedback loop. There is thus no possibility of monitoring the operation of the system to ascertain that, in fact, no difference does exist between the manual and automatic controllers at the instant of transfer. Furthermore in such a prior art system, of necessity, the feedback capacitor must be switched into and out of the feedback circuit of the controller at the instant of transfer so that a switch failure can materially effect the operation of the control.

There are systems available which do not bump the controlled variable, these are commonly known as "hand" transfer systems. A serious shortcoming of these so called "hand" transfer methods is that a time consuming adjustment is required before the system can be transferred from automatic to hand operation. In case of a serious disruption of the automatic control system a dangerous condition could exist while the operator makes the necessary adjustments. When transferring a "hand" transfer system from the manual controller to the automatic controller a second adjustment is required. In this situation the time element is not critical. One definite advantage of the "hand" transfer system is the ability to align the output of the automatic controller and the manual controller thereby eliminating the bump problem.

It is the principal object of my invention to provide apparatus for bumpless transfer of a control system from one mode of operation to another by continually maintaining the automatic control signal and the manual control signal equal regardless of whether the system is in the automatic or manual mode.

Another object of my invention is to provide apparatus for bumpless pushbutton transfer from automatic to manual operation and vice versa.

Another object of my invention is to provide apparatus for maintaining the output of the hand controller equal to the automatic controller during automatic operation.

Another object of my invention is to provide apparatus for equalizing the output of the automatic controller with that of the manual controller before transferring from manual to automatic operation.

Another object of my invention is to provide a transfer mechanism wherein the difference between the automatic and hand signals is continuously monitored.

Various other objects and advantages will appear from the following description of the invention, and will be particularly pointed out hereafter in the appended claims.

Referring to the drawings:

FIG. 1 is a schematic illustration of an application of the invention to a control system;

FIG. 2 is a block diagram of the system illustrated in FIG. 3;

FIG. 3 is similar to FIG. 1 illustrating another embodiment of the invention.

Referring more particularly to FIG. 1 of the drawings, I show a single element control system comprising a final control element or valve 10 which is actuated pneumatically in accordance with the flow rate in a conduit 12 to control the flow rate of fluid in a conduit 14. A transmitting device 16 responds to the flow rate of fluid in conduit 12, as is represented by the differential pressure across a primary measuring element 18, and is effective to actuate a movable core 20 of a movable core transformer having a primary winding 22 and a pair of serially connected, oppositely wound, secondary windings 24 and 26. The primary winding 22 is connected across a suitable source of alternating voltage, as indicated schematically, while the secondary windings 24 and 26 are coupled to a demodulator 28. With this arrangement, an alternating current modulated signal is supplied to the input of the demodulator 28 with a carrier frequency corresponding to the frequency of the A-C source, the modulated amplitude of the signal being proportional to flow rate of fluid in conduit 12. Circuitry of this nature is well known to those skilled in the art, therefore, further description is deemed unnecessary.

The demodulator 28 is effective to remove the A-C carrier signal to establish a variable D-C signal at its output terminals proportional to the flow rate in conduit 12. For a full description of a demodulator circuit suitable for use in my system reference is made to the copending application of Koppel et al., filed Sept. 14, 1962, Ser. No. 223,742, now Patent 3,225,289 which issued on Dec. 21, 1965. The transmitting device 16 and demodulator 28 may be calibrated to produce any desired range and level of direct voltage at the output terminals of demodulator 28 in the range of flow rates encountered. As disclosed in the above mentioned application, this direct voltage signal may be caused to vary in the range of −10 to +10 volts.

The output of demodulator 28 is compared with the output of a manually adjustable direct current source 30 at a summing junction, indicated schematically at 32, to establish an error signal representative of the variation of the flow rate from its assigned "setpoint." The output of the source 30 is manually adjustable in the range of −10 to +10 volts to provide a "setpoint" voltage to which the output of demodulator 28 is added algebraically.

The error signal thus established at the summing junction 32 is impressed on the input terminals of an automatic controller 34 which may be composed of one or more plug-in control action units of the type disclosed in the application of Hornfeck et al., filed Apr. 8, 1959, Ser. No. 805,019, now abandoned. The controller 34, illustrated in FIG. 1, has both proportional and integral action for producing an output signal at terminal 36 that varies both proportionally and as the time integral of the error signal applied to the input terminal 38.

In general the controller 34 comprises a high gain, low output impedance, D-C amplifier 40 having a passive input resistor $R_1$ and a passive feedback resistor $R_2$. The gain of the controller 34 is determined by the relative sizes of resistors $R_1$ and $R_2$ and the position of the wiper arm of potentiometer 42. A capacitor $C_2$ is connected in series with the resistor $R_2$, in the feedback circuit, to provide reset or integrating action, the "repeats per minute" of the reset action are adjustable by means of a variable resistance 43. During automatic operation of the system, the output of the controller 34 is applied directly to an electric to pneumatic converter 44 which is effective to establish a proportional pneumatic signal for application to the valve 10. Such converting devices are now well known to those skilled in the art. For those not familiar with such devices, a complete description of a unique E/P converter is given in the patent of Dustin et al., U.S. 3,080,878.

During manual operation of the system the controller 34 is disconnected from the converter 44 and an electrical signal is established manually and applied thereto. As a result, the valve 10 is positioned independently of the controller 34 output and independently of variations in the flow rate in conduit 12.

A servo operated potentiometer 50 provides the manual control signal for driving the valve 10 and a manual-automatic selector station 48 provides a means of transferring control of said valve from the controller 34 to said servo operated potentiometer 50. A movable contact arm 52 of the potentiometer 50 is adapted to be connected by switching means of the selector station 48 to be described, to the converter 44, when the system is in the manual mode of operation. Said movable contact arm 52 is positioned by an electric motor 56 acting through suitable linkage 58. The motor 56 has two wound shaded pole windings 62 and 64 and a main field winding 60 continuously energized from an alternating source as shown schematically. For those not familiar with shaded pole motor operation, to produce rotation of the motor in one direction or the other, one or the other of the shaded pole windings is short circuited forming a closed path for currents induced therein by energization of a main field winding. Thus, part of the magnetic field, under that portion of the field pole enclosed by the shading winding, is displaced in time with respect to the main field winding. The direction of rotation of the motor being dependent upon which one of the shading windings is short circuited. In my application the direction of rotation of the electric motor 56, when in the manual mode of operation, is determined by shorting either winding 62 or 64 by closing neutral return switch 66 against either the R or L contact. This, as is clear from the drawing, shorts one shaded pole winding or the other thereby causing rotation in a selected direction. Thus, closure of switch 66 to either the R or L position will effect manual positioning of the valve 10 in the desired direction.

As previously mentioned, the outputs of the two alternate control mechanisms must be equal at the instant of transfer of control from one to the other to avoid introducing a shock or bump into the system. An important feature of my invention is that the two control signals are maintained equal at all times, not only at the instant of transfer. This positively eliminates any system instability or bump when transferring from one mode of operation to another and allows continuous monitoring of the difference between hand and automatic signals.

Referring first to the automatic mode of operation, means are provided for effecting continuous positioning of the wiper arm 52 in accordance with the output of the automatic controller 34 so that at any instant during automatic operation the potential at the wiper arm 52 is equal to the output potential thereof. This means includes, in addition to the previously discussed shaded pole motor 56, a servo amplifier 68, which is effective to energize the shaded pole windings 62 and 64. The shaded pole windings 62 and 64 are now connected in a series relationship, through yet to be described contacts, to the output of said servo amplifier 68. The direction of rotation of the shaded pole motor 56 being controlled by reversing the phase relationship between the main field winding 60 and the shaded pole windings 62 and 64, the motor 56 now acting as a two phase servo motor.

The potentiometer 50 connects to a constant voltage source, as shown schematically. The wiper arm 52, which in addition to providing a positioning signal to the valve 10 during manual operation, establishes a voltage feedback signal to said servo amplifier 68. This voltage is continuously compared with the output potential of the automatic controller 34 during automatic operation of the system. Thus, through selective energization of the shaded pole windings 62 and 64 continuous followup positioning of the wiper arm 52 will occur to maintain the manual control voltage equal to the output of the automatic controller 34 during automatic operation.

During manual operation of the system, the servo amplifier 68 is disconnected from the motor which positions the wiper arm 52. The wiper arm is now positioned by an operator closing switch 66 against the R or L contact as hereinbefore described.

Since, during manual operation, the wiper arm 52 is positioned independently of the automatic controller 34 output, separate means, including a second servo operated potentiometer 70, provides equalization of the two voltages when in the manual mode of operation. This separate means, in addition to said servo operated potentiometer 70, includes a second wound shaded pole motor 72 connected to position a wiper arm 74 through connecting linkage 76. The potentiometer 70 connects to a direct current supply, as shown, and includes a center tap 78 connected to capacitor $C_2$ in the feedback loop of the amplifier 40. Capacitor $C_2$ also connects to the wiper arm 74 of the potentiometer 70. When the valve 10 is being positioned from the manual controller, the voltage across capacitor $C_2$ is the difference between the potential at the center tap 78 and the wiper arm 74. The amplifier 40 output is maintained at the desired level by the wiper arm 74. An important feature of my invention is the continued connection of the feedback capacitor $C_2$ in the feedback loop. In many prior art systems, the feedback capacitor is disconnected from the feedback loop when in the manual mode.

With the system in the manual mode of operation, the output of the automatic controller 34 is maintained as follows. The servo amplifier 68 is disconnected from the shaded pole windings 62 and 64 of the first servo motor 56 and connected to the shaded pole windings 80 and 82 of a second servo motor 72. The second servo motor 72 is identical in construction and operation, to the first servo motor 56, and as such, includes a main field winding 84 connected to a suitable source of A-C current, shown schematically. In the manual mode of operation as in the automatic, the servo amplifier 68 responds to the difference between the potential at wiper arm 52 and the automatic controller 34 output. Any unbalance between these two voltages causes the second servo motor 72 to operate and reposition the wiper arm 74. The voltage applied to the feedback capacitor $C_2$ is thereby varied as is the output of the automatic controller 34. Whether the voltage across capacitor $C_2$ must be increased or decreased to maintain the hand and automatic controllers in balance depends upon the polarity of the difference signal at the servo amplifier 68. Thus, the wiper arm 74 is positioned by the second servo motor 72 to eliminate any difference that may exist between the automatic and hand control signal thus eliminating the possibility of a system disturbance when transferring from manual to automatic operation. This operation may be described mathematically as follows:

$$E_o = -K(E_i)\frac{R_2}{R_1} + E_C$$

where:

$E_o$ = the output signal from controller 34
$E_i$ = the input signal to the controller 34
$R_2$ = the resistance value of the resistance $R_2$
$R_1$ = the resistance value of the resistance $R_1$
$E_C$ = the voltage across capacitor $C_2$
K = the voltage at the center tap of resistance 42

Now by the operation previously described $E_C$ is varied so that:

$$E_o = E_{Man}$$

where $E_{Man}$ = the signal established by operation of resistance 70.

Now:

$$E_O - E_{Man} = -K(E_i)\frac{R_2}{R_1} + E_C - E_{Man}$$

Hence:

$$E_C = K(E_i)\frac{R_2}{R_1} + E_{Man}$$

Referring now to the switching means for initiating and effecting the hereinbefore described transfer operation; a relay coil TR is connected in series with pushbutton switches 86 and 88 across an A-C energizing source, shown schematically. The switch 86, indicated as "Hand," is biased to a normally closed position and adapted to be actuated to an open position by the operator to effect a transfer from automatic to manual operation. The switch 88, indicated as "Auto," is biased to a normally opened position and is adapted to be actuated to a closed position by the operator to initiate a transfer from manual to automatic operation.

The relay coil TR is provided with a plurality of contacts $T_1$, $T_2$, $T_3$, $T_4$, $T_5$, $T_6$, $T_7$, $T_8$, $T_9$, and $T_{10}$. Contacts $T_1$, $T_2$, $T_4$, $T_5$, $T_6$, and $T_8$ are shown in an open position and contacts $T_3$, $T_7$, $T_9$ and $T_{10}$ in the closed position. It is believed the function of the pushbutton switches 86 and 88 and relay TR will become apparent from the following summary of the operation of the system illustrated in FIG. 1.

Assume that at the startup the operator momentarily actuates the switch 88 to a closed position to effect automatic operation of the system. Closure of switch 88 will complete an energizing circuit for relay coil TR thereby opening contacts $T_1$, $T_2$, $T_4$, $T_5$, $T_6$ and $T_8$ and closing contacts $T_3$, $T_7$, $T_9$ and $T_{10}$. Contact $T_7$ is connected in a holding circuit around the switch 88 and will maintain energization of the relay TR when the switch 88 is subsequently released to its open position. The system is now conditioned for automatic operation, as illustrated in FIG. 1.

As a result of energization of relay TR the output voltage of the controller 34 is applied directly to the converter 44 through contact $T_9$ while application of the manual control voltage to the converter is prevented by open contact $T_8$. The output of the controller 34, however, is applied by conductor 90 directly to the servo amplifier 68 to effect follow-up positioning of the wiper arm 52. Contacts $T_3$ and $T_{10}$ are closed to permit energization of the shaded pole windings 62 and 64 of the servo motor 56 when an unbalance exists between the inputs to said servo amplifier 68. Contacts $T_4$ and $T_5$ are open during automatic operation to prevent positioning of the wiper arm 74. Contact $T_6$ is open to prevent energization of the shaded pole windings 62 and 64 as a result of accidental closure of switch 66 in either its R or L position.

During automatic operation contacts $T_1$ and $T_2$ are open thereby isolating the capacitor $C_2$ from the voltage produced at the wiper arm 74. As a result of the circuit conditions thus established, valve 10 will be continuously positioned from the output of the automatic controller 34 which is determined by the flow rate in conduit 12. In addition, servo amplifier 68 is responsive to the output signal of the controller 34 to continuously effect the follow-up movement of the wiper arm 52 to maintain the potential of wiper arm 52 equal to the controller 34 output voltage. Thus, at any instant during automatic operation the manual control voltage at wiper arm 52 is equal to the output of controller 34.

Assume now that the operator desires to operate the valve 10 manually. To accomplish this the "Hand" switch 86 is momentarily actuated to an open position thereby breaking the energizing circuit for the relay TR. As a result, contact $T_9$ will open, disconnecting the automatic controller 34 output from the converter 44 and contact $T_8$ will close to connect the wiper arm 52 and apply the manual control voltage to the converter 44. Contacts $T_3$ and $T_{10}$ will open and contact $T_6$ will close to transfer control of energization of the shaded pole windings 62 and 64 to the switch 66 which may be selectively actuated by the operator to effect positioning of the valve 10.

When transferring to manual operation contacts $T_4$ and $T_5$ close, upon de-energization of relay TR, thereby connecting the second servo motor 72 to respond to the output of the servo amplifier 68. Contacts $T_1$ and $T_2$ will close thereby connecting the capacitor $C_2$ to the center tap 78 and the wiper arm 74. As a result the automatic controller 34 output will be determined by the voltage connected to feedback capacitor $C_2$.

When it is desired to return the system to automatic operation the operator momentarily closes switch 88 to effect re-energization of relay TR and re-establishment of the holding circuit through contact $T_7$. Contact $T_9$ will close and contact $T_8$ will open to apply the automatic controller 34 output to the converter 44, while contacts $T_3$, $T_4$, $T_5$, $T_6$, and $T_{10}$ will be actuated to transfer control of the first servo motor 56 to the servo amplifier 68.

Contacts $T_1$ and $T_2$ open and disconnect the feedback capacitor $C_2$ from the center tap 78 and the wiper arm 74. I do not require contacts to return the feedback capacitor $C_2$ to the feedback loop. Thus, the output of the automatic controller 34 is maintained equal to the hand control signal and ready to resume normal automatic operation without waiting for the feedback loop to be reconnected. As a result a bumpless transfer from manual back to automatic operation is achieved.

The application of the invention disclosed in FIG. 1 of the drawings utilizes a single element control system. In FIG. 3 of the drawings, there is shown an application of the invention to a two element control system wherein the position of a final control element is controlled in accordance with the variations in two different variables. In FIG. 2 there is shown a block diagram of such a control system. More particularly, a steam pressure transmitter 92 establishes an electric signal which is compared with a setpoint signal generated by the device 30 at the summing junction 32 to establish an error signal representative of the departure of a steam pressure condition from setpoint. This signal is provided with proportional plus reset characteristics in the automatic controller 94 of the type shown in FIG. 1 and disclosed in detail in the before mentioned application of Hornfeck et al., Ser. No. 805,019.

The output signal of the controller 94 is compared with a signal representative of steam flow established by a transmitter 96 in a summing control action unit 98 which may also be of the type disclosed in the Hornfeck et al. application, Ser. No. 805,019. The output of the control action unit 98 is taken through a selector station 100, which, as now will be described, is provided with means for effecting bumpless transfer between manual and automatic operation.

Referring now to FIG. 3, the automatic controller 94 is of the proportional plus reset type illustrated in FIG. 1, and includes the amplifier 40, input resistor $R_1$, feedback resistor $R_2$, gain potentiometer 42, reset adjustment potentiometer 43, and reset capacitor $C_2$. The control action unit 98, as described in the Hornfeck et al. application, Ser. No. 805,019, includes an amplifier 40A, input resistors $R_3$ and $R_4$, and feedback resistor $R_5$. Input terminals 102 are connected as shown to the outputs of controller 94 and transmitter 96. The controller 94 is effective to produce a voltage drop across resistor $R_4$ equal to its output voltage. The transmitter 96 is similarly effective to produce a voltage drop across resistor $R_3$. With this arrangement the output of the summing controller 98, at its terminal 104, will be proportional to the sum of the outputs of the controller 94 and transmitter 96.

It will be apparent that with the two element control system at the instant of transfer from automatic to manual operation or vice versa, the signal outputs of the summing control action unit 98 and the servo amplifier 68 must be equal to avoid a system bump. To accomplish this the output of the summing controller 98, when on automatic operation, is compared with the voltage at the wiper arm 52 of the potentiometer 50. Any unbalance between these voltages causes the servo amplifier 68 to position the motor 56 until the unbalance is zero. This operation is identical with that described in regard to the single element control system of FIG. 1. Thus, the manual control voltage will equal the output of summing controller 98 for bumpless transfer from automatic to manual operation.

In the manual mode of operation, the summing controller 98 output is disconnected from the converter 44. Again the servo amplifier 68 is sensitive to any unbalance between the summing controller 98 output and the wiper arm 52 voltage which is now connected to the converter 44. Instead of the first servo motor 56 being positioned, when an unbalance exists between the two control signals, the second servo motor 72 is now energized. The second servo motor 72 drives the wiper arm 74 of the center-tapped potentiometer 70 as previously explained. Again the voltage developed between the wiper arm 74 and the center tap 78 of the potentiometer 70 is applied to the reset capacitor $C_2$ as in the single element control system. Now, instead of the reset controller 94 output being maintained equal to the hand control signal the voltage applied to capacitor $C_2$ must maintain the summing controller 98 output equal to the hand signal. Herein lies one important advantage of my system, since the voltage applied to capacitor $C_2$ when on hand control, is maintained to equalize the summing controller 98 output and the hand signal.

As far as the actual switching operation is concerned, the embodiment of FIG. 3 is identical to that of FIG. 1. When the operator momentarily closes switch 88 of manual-station 100, contacts $T_3$, $T_7$, $T_9$ and $T_{10}$ close thereby putting the system in the automatic mode of operation. The first servo motor 56 is connected to the servo amplifier 68 and the second disconnected. To transfer from the automatic mode of operation to the manual the operator opens switch 86 thereby closing contacts $T_1$, $T_2$, $T_4$, $T_5$, $T_6$ and $T_8$. The transfer from one mode of operation to the other will be bumpless since the summing controller 98 output is maintained equal to the manual signal at all times.

It will be understood that various changes in the components and arrangements herein described can be made without deviating from the principle and scope of the invention as expressed in the appended claims.

What I claim as new and desire to secure by Letters Patent of the United States is:

1. In a control system including a final control element, first electrically operative means for controlling the position of said control element, second electrically operative means for controlling the position of said control element, an electric relay having contact means effective in one position of said relay to connect said first electrically operative means to said control element and another position of said relay to connect said second electrically operative means to said control element, the combination comprising:

a feedback circuit means including a feedback capacitor associated with said first electrically operative means, said capacitor providing controller reset action;

circuit means for charging said capacitor to maintain the output of said first operative means equal to the output of said second operative means when said final control element is positioned from said second operative means; and contact means external from said first operative means to remove said charging means from said capacitor when said final control element is positioned from said first operative means, whereby the proportional and reset characteristics of the output of said first operative means are maintained during final control positioning by either of said first or second electrically operative means thereby permitting external monitoring of the total output signal of said first electrically operative means during those periods in which final control positioning is provided by the second electrically operative means and thus insuring smooth transfer from the second electrically operative control means to the first electrically operative control means and vice versa.

2. In a control system as set forth in claim 1 wherein said capacitor charging circuit consists of:

a source of D.C. voltage; and a potentiometer connected to said D.C. voltage source and having a terminal connected to one side of said capacitor and a wiper arm terminal to the other side of said capacitor for charging said capacitor to maintain the output of said first operative means equal to the output of said second operative means during the periods in which said control element is positioned from said second operative means.

3. In a control system as set forth in claim 2 further including:

a servo-amplifier responsive to the difference between the outputs of said first and second operative means; and a servo-motor mechanically linked with said wiper arm and connected to said servo-amplifier to position said wiper arm in accordance with said servo-amplifier output, thereby maintaining the output of said first electrically operative means equal to the output of said second electrically operative means when said final control element is positioned from said second operative means.

4. In a control system as set forth in claim 3 further including:

a second potentiometer connected to a D.C. voltage source and having a wiper arm connected to said servo-amplifier; and a second servo-motor responsive to the output of said servo-amplifier and mechanically linked with said first potentiometer for positioning said wiper arm in accordance with said servo-amplifier output thereby maintaining the output of said second electrically operative means equal to the output of said first electrically operative means when final control element is positioned from said first operative means.

5. In a control system as set forth in claim 1 wherein said first electrically operative means includes an electric controller comprising an amplifier having a feedback circuit, said feedback circuit including a capacitor for introducing reset characteristics into the output signal of said controller when the final control element is positioned from either the first or second electrically operative means; and said second electrically operative means comprising a manually adjustable means for controlling the position of the final control element.

References Cited

UNITED STATES PATENTS

| | | |
|---|---|---|
| 2,679,022 | 5/1954 | McIlhenny. |
| 2,740,082 | 3/1956 | Sedgfield. |
| 3,044,002 | 7/1962 | Lejon. |
| 3,068,387 | 12/1962 | Koppel. |
| 3,069,554 | 12/1962 | Decker. |
| 3,077,552 | 2/1963 | Koppel. |

ORIS L. RADER, *Primary Examiner.*

T. E. LYNCH, *Assistant Examiner.*

U.S. Cl. X.R.

318—29